United States Patent Office 2,858,328
Patented Oct. 28, 1958

2,858,328

HALOPHENYL 3,4-DICHLOROCARBANILATES

David J. Beaver, Richmond Heights, and Paul J. Stoffel, St. Louis, Mo., assignors to Monsanto Chemical Company, St. Louis, Mo., a corporation of Delaware No Drawing. Application May 23, 1955
Serial No. 510,548

5 Claims. (Cl. 260—471)

This invention relates to new and useful aromatic esters of 3,4-dihalocarbanilic acid and to the process for making same.

The new compounds of this invention may be represented by the general formula

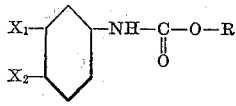

where $X_1$ and $X_2$ are like or unlike halogen atoms, e. g. chlorine or bromine, and where R is a halogenated benzenoid hydrocarbon radical, such as 2-chlorophenyl; 3-chlorophenyl; 3-bromophenyl; 4-chlorophenyl; 4-bromophenyl; 2,4-dichlorophenyl; 3,4-dichlorophenyl; 3,4-dibromophenyl; 2,4,5 - trichlorophenyl; 3,4,5 - trichlorophenyl; 3,4,5-tribromophenyl; 3-chloro-4-methylphenyl; 3,5-dichloro-4-methylphenyl; 3-chloro - 4 - n-butylphenyl; 3-chloro-4-isohexylphenyl; the various chlorinated biphenylyls such as 3-chloro-4-biphenylyl and the like. While R may contain 1 to 5 halogen atoms, it is preferred that it contain not more than 3 halogen atoms. Of the new compounds of this invention those wherein $X_1$ and $X_2$ are chlorine atoms and wherein R is a phenyl radical containing a chlorine atom in the 3-position and containing at least one unsubstituted ortho position (i. e., either the 2- or 6-positions or both being unsubstituted) are particularly preferred.

The new compounds exhibit herbicidal and fungicidal properties.

As illustrative of the new compounds and the mode of preparation is the following:

EXAMPLE I

In a suitable reaction vessel equipped with a thermometer, agitator and vent containing a calcium chloride drying tube is added 6.9 parts by weight of 3,4-dichlorophenol and 8.0 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 12.8 parts of 3,4-dichlorophenyl 3,4-dichlorocarbanilate as colorless needles melting at 148.1–149.9° C. is obtained.

Replacing 3,4-dichlorophenol and 3,4-dichlorophenylisocyanate, respectively, in Example I with chemically equivalent weights of 3,4-dibromophenol and 3,4-dibromophenylisocyanate there is obtained 3,4-dibromophenyl 3,4-dibromocarbanilate.

EXAMPLE II

In a suitable reaction vessel equipped with a thermometer, agitator and vent containing a calcium chloride drying tube is added 6.5 parts by weight of o-chlorophenol and 9.4 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 11.3 parts of 2-chlorophenyl 3,4-dichlorocarbanilate as colorless needles melting at 150.6–151.5° C. is obtained.

EXAMPLE III

In a suitable reaction vessel equipped with a thermometer, agitator and vent containing a calcium chloride drying tube is added 6.5 parts by weight of m-chlorophenol and 9.4 parts by weight of 3,4-dichlorophenylisocyanate. The mixture is heated at 85–90° C. for 16 hours. The crystalline solid so obtained is taken up with hot hexane and the solution cooled, filtered and the collected crystalline residue dried. 11.2 parts of 3-chlorophenyl 3,4-dichlorocarbanilate as colorless granules melting at 112.0–112.6° C. is obtained.

Replacing m-chorophenol in Example III with a chemically equivalent weight of m-bromophenol there is obtained 3-bromophenyl 3,4-dichlorocarbanilate.

Replacing m-chlorophenol and 3,4-dichlorophenylisocyanate in Example III, respectively, with chemically equivalent weights of m-bromophenol and 3,4-dibromophenylisocyanate there is obtained 3-bromophenyl 3,4-dibromocarbanilate.

EXAMPLE IV

In a suitable reaction vessel equipped with a thermometer, agitator and vent containing a calcium chloride drying tube is added 6.5 parts by weight of p-chlorophenol and 9.4 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 14.1 parts of 4-chlorophenyl 3,4-dichlorocarbanilate as glistening plates melting at 149.5–150.7° C. is obtained.

EXAMPLE V

In a suitable reaction vessel equipped with a thermometer, agitator and vent containing a calcium chloride drying tube is added 3.8 parts by weight of 4-chloro-m-cresol and 4.7 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 5.9 parts of 3-methyl-4-chlorophenyl 3,4-dichlorocarbanilate as fine colorless needles melting at 147.2–148° C. is obtained.

EXAMPLE VI

In a suitable reaction vessel equipped with a thermometer, agitator and vent containing a calcium chloride drying tube is added 4.0 parts by weight of 4-chloro-3,5-xylenol and 4.7 parts by weight of 3,4-dichlorophenylisocyanate. The mixture is heated at 85–90° C. for 16 hours. The crystalline solid so obtained is taken up with hot ethanol and the solution cooled, filtered and the collected crystalline residue dried. 7.0 parts of 3,5-dimethyl-4-chlorophenyl 3,4-dichlorocarbanilate as colorless needles melting at 173.7–174.2° C. is obtained.

EXAMPLE VII

In a suitable reaction vessel equipped with a thermometer, agitator and vent containing a calcium chloride drying tube is added 4.9 parts by weight of 2,4,5-trichlorophenol and 4.7 parts by weight of 3,4-dichlorophenylisocyanate. The mixture is heated at 85–90° C. for 16 hours. The crystalline solid so obtained is slurried with hot ethanol, filtered and the collected crystalline residue dried. 6.8 parts of 2,4,5-trichlorophenyl 3,4-dichlorocarbanilate as white powder melting at 166.4–167.2° C. is obtained.

Replacing 2,4,5-trichlorophenol in Example VII with a chemically equivalent weight of 3,4,5-trichlorophenol there is obtained 3,4,5 - trichlorophenyl 3,4 - dichlorocarbanilate.

In the preparation of the new compounds, while solvents are in general not necessary in that the reactants usually provide a fluid medium, such inert solvents as hexane, toluene, chlorobenzene, and the like may be employed. The reaction temperatures employed in preparing the new compounds will depend upon the particular reactants and in general will be in the range of room temperature to the reflux temperature of the system.

The compounds of the general formula

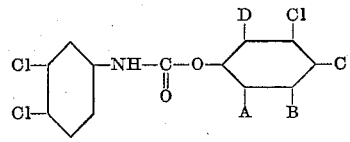

where A and D are unlike atoms selected from the group consisting of hydrogen and chlorine and where B and C are like or unlike atoms selected from the group consisting of hydrogen and chlorine have been found to exhibit outstanding bacteriostatic properties in detergent soap formulations. As illustrative of such 3-chlorophenyl 3,4-dichlorocarbanilate, 3,4-dichlorophenyl 3,4-dichlorocarbanilate and 2,4,5-trichlorophenyl 3,4-dichlorocarbanilate, respectively, were incorporated in an "Ivory" brand neutral high grade white tallow soap in a weight ratio of one part to 50 parts by weight soap. Aliquots of each were added to a Sabourard's dextrose agar medium so as to give concentrations of 10 and 1 parts per million of the respective compounds in the agar. The agar in each case was then poured into a Petri dish, allowed to harden and then inoculated with a standard culture of *Micrococcus pyogenes* var. *aureus* of standard resistance. The incubation in each instance was made simultaneously at 37° C. for 48 hours. The extent of growth is noted below:

*Table 1*

| Concentration, p. p. m. | 10 | 1 |
|---|---|---|
| 3-chlorophenyl 3,4-dichlorocarbanilate | none | none. |
| 3,4-dichlorophenyl 3,4-dichlorocarbanilate | do | Do. |
| 2,4,5-trichlorophenyl 3,4-dichlorocarbanilate | do | moderate. |

Relatively small amounts of these 3-chlorophenyl 3,4-dichlorocarbanilates in a detergent soap composition have been found to yield effective bacteriostatic detergent soap compositions. Amounts as low as 0.5 to 1% by weight based upon the weight of the detergent soap have proved satisfactory in some instances. However, it is preferred to employ these 3-chlorophenyl 3,4-dichlorocarbanilates in amounts in the order of 1 to 3% by weight based on the detergent. While larger amounts, as for example up to 10% by weight, may be employed, the upper limit will be determined by practical considerations. Various colors, anti-oxidants, perfumes, water softeners, emollients, and the like may be included where desirable in detergent compositions containing these new trichlorocarbanilates. The term "soap" or "detergent soap" as used herein is employed in its popular or ordinary meaning, i. e. those cleansing compositions prepared from an alkali metal compound such as potassium or sodium hydroxide and a fat or fatty acid, both saturated and unsaturated.

These new trichlorocarbanilate bacteriostatic agents may be added to the soap in any suitable manner during the crutching or milling or similar operation. They may be dissolved in a suitable solvent prior to admixing with the soap. If it is desired the new bacteriostatic agents may be added to the soap without dissolving them previously. In the case of "frame" soaps, it is preferred to add the bacteriostatic agent to the soap during the crutching operation. With milled soaps, it is preferred to make the addition during the milling operation. In the case of liquid soaps, it is preferred to affect the addition while the agent is in solution. In general, any method which results in the bacteriostatic agent being uniformly incorporated into the soap product is satisfactory.

While this invention has been described with respect to certain embodiments it is not so limited and it is to be understood that variations and modifications thereof obvious to those skilled in the art may be made without departing from the spirit or scope of this invention.

What is claimed is:

1. Compounds of the structure

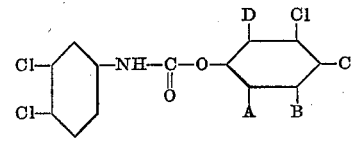

where A, B, C and D are atoms selected from the group consisting of hydrogen and chlorine, A and D being unlike atoms.

2. 3-chlorophenyl 3,4-dichlorocarbanilate.
3. 3,4-dichlorophenyl 3,4-dichlorocarbanilate.
4. 2,4,5-trichlorophenyl 3,4-dichlorocarbanilate.
5. The process of making the compound of claim 1 which comprises reacting 3,4-dichlorophenylisocyanate with a phenol of the structure

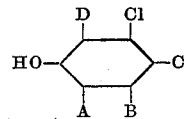

where A, B, C and D are atoms selected from the group consisting of hydrogen and chlorine, A and D being unlike atoms.

References Cited in the file of this patent

UNITED STATES PATENTS

| 2,634,289 | Butler | Apr. 7, 1953 |
| 2,675,302 | Beaver et al. | May 11, 1954 |
| 2,692,862 | Lipsitz | Oct. 26, 1954 |
| 2,734,911 | Strain | Feb. 14, 1956 |

OTHER REFERENCES

Thompson: Botanical Gazette, 107, 490–2, 499, 503 and 504 (1946).

Shaw et al.: Chem. Abst. 47, 11638 (1953).